United States Patent [19]

Thomas et al.

[11] 3,860,570

[45] Jan. 14, 1975

[54] TRIPEPTIDE INTERMEDIATE FOR MAKING TRH

[75] Inventors: Alford Mitchell Thomas; Paul Kurath, both of Waukegan, Ill.

[73] Assignee: Abbott Laboratories, North Chicago, Ill.

[22] Filed: Feb. 26, 1973

[21] Appl. No.: 335,625

[52] U.S. Cl. .............................. 260/112.5, 424/177
[51] Int. Cl. ..................... C07c 103/52, A61k 27/00
[58] Field of Search ................................ 260/112.5

[56] References Cited
UNITED STATES PATENTS

| | | | |
|---|---|---|---|
| 3,746,697 | 7/1973 | Folkers et al. | 260/112.5 |
| 3,753,969 | 8/1973 | Folkers et al. | 260/112.5 |
| 3,757,003 | 9/1973 | Folkers et al. | 260/112.5 |

OTHER PUBLICATIONS

Inouye et al.: Bull. Chem. Soc. Japan, 44, 1689–91 (1971).

Burgus et al.: C. R. Acad. Sc. Paris, Ser. D, 269, 226–28 (1969).

Chang et al.: J. Med. Chem., 14, 484–7 (1971).

*Primary Examiner*—Lewis Gotts
*Assistant Examiner*—Reginald J. Suyat
*Attorney, Agent, or Firm*—Paul D. Burgauer; Robert L. Niblack

[57] ABSTRACT

A new synthetic route is described that leads to TRH in excellent yield; it uses a new precursor, benzyloxycarbonyl-L-($O^5$-methyl)glutamyl-L-histidyl-L-prolinamide. This substance can be made in a three-step process providing good yields. The new precursor can be converted to TRH by simple hydrogenolysis and cyclization. These two steps can be run without isolation of the intermediate L-($O^5$-methyl)glutamyl-L-histidyl-L-prolinamide.

3 Claims, No Drawings

TRIPEPTIDE INTERMEDIATE FOR MAKING TRH

DETAILED DESCRIPTION OF THE INVENTION

In recent years, theories were advanced that the structure of the thryotropin releasing factor or hormone (hereinafter simply referred to as TRH) corresponds to that of pyroglutamyl-histidyl-prolinamide wherein all amino acids are in the L-form. TRH has now become a valuable drug and laboratory tool; it is useful in the treatment of certain types of severe depression, as a prolactin stimulant for lactating or milk-producing warm-blooded animals and for analysis of pituitary gland dysfunctions.

In the past few years, numerous methods have been proposed for the synthetic preparation of TRH. Some of these methods produce TRH without a high degree of purity or in low yield or a combination of these deficiencies, requiring numerous purification steps.

It is therefore an object of the present invention to provide a new synthesis for TRH; it is another object of this invention to provide a new precursor for TRH; it is still a further object of this invention to provide a method for obtaining TRH in substantially quantitative yields from this new precursor; it is a still further object of this invention to provide a prolactin stimulant that has essentially no psychotropic activity.

These and other objects are accomplished by providing a compound of the formula:

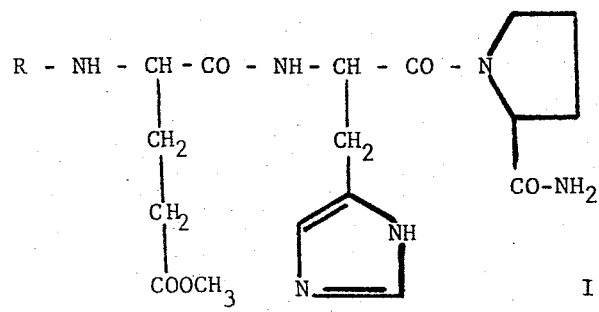

I wherein R is hydrogen or the benzyloxycarbonyl blocking group and the process of converting the blocked tripeptide I to its deblocked analog or directly or indirectly to TRH. The deblocked peptide can be cyclized with a tertiary amine without isolation; alternately, it can be isolated and purified in routine fashion and represents a valuable biologically active compound (Structure I, $R = H$).

The compound of formula I wherein R is hydrogen or the benzyloxycarbonly-blocked analog thereof, both can be considered direct precursors for TRH because no further intermediate isolation is necessary. However, the compound wherein R is hydrogen is of additional utility since it exhibits pronounced prolactin stimulating activity.

Both compounds of structure I can easily be converted to TRH. In the case of R being the above blocking group, it is deblocked by hydrogenolysis in an inert medium with gaseous hydrogen in the presence of finely divided palladium as the catalyst. This catalytic hydrogenolysis proceeds rapidly at room temperature, although a temperature range of between 15° and 55° C. can safely be used. The palladium used for the above reaction may be employed in any of the numerous catalytic forms that are available in the trade; it may be used in a weight ratio of between 2 and 50%, based on the amount of the blocked tripeptide, preferably in amounts of from 2-20%. The resulting compound is that of formula I wherein R is hydrogen which, upon standing with a tertiary amine, produces TRH in almost quantitative yield.

In a preferred embodiment, the new compounds of structure I are composed of amino acid moieties which are in the L-configuration. The described catalytic hydrogenolysis and subsequent cyclization proceed without racemization, i.e., the compound known as TRH for which many commercial and laboratory uses have been described previously, is produced. However, when any of the above amino acid moieties are in the D-form, a tripeptide of the same chemical structure as TRH is obtained differing therefrom only by its optical configuration. Such optical isomers are useful as laboratory tools and in the synthesis of larger peptides through standard reactions with active esters of other amino acids. The preferred compound of structure I therefore is the L-($O^5$-methyl)glutamyl-L-histidyl-L-prolinamide or the corresponding $N^\alpha$-benzyloxycarbonyl analog.

In a specific embodiment, the compounds of structure I are made by converting benzyloxycarbonyl-pyroglutamyl N-hydroxysuccinimide ester with the sodium salt of histidine followed by acidification with hydrochloric acid to benzyloxycarbonyl-pyroglutamyl-histidine which, in turn, is converted to benzyloxycarbonyl-pyroglutamyl-histidyl-prolinamide by reacting it with prolinamide in the presence of N-hydroxysuccinimide and dicyclohexylcarbodiimide (hereinafter referred to as DCCI). This protected tripeptide, upon standing in methanol, undergoes ring-opening of the pyroglutamyl moiety, producing the corresponding $O^5$-methyl ester (formula I, $R =$ benzyloxycarbonyl) and upon hydrogenolysis in the presence of an acid, the corresponding deblocked compound ($R = H$) is obtained as its acid addition salt in substantially quantitative yield.

The blocked tripeptide of formula I is obtained in high yield through the above process sequence; deblocking is substantially quantitative and TRH is obtained therefrom without any optical changes in the molecule and substantially without loss through by-product formation.

In order to illustrate the process of making the above new compounds and their use, reference is made to the following examples which, however, are not to be construed as limiting the invention in any respect. In all instances, the obtained compounds were identified through optical rotations (Hilger and Watts polarimeter), the IR-spectra (Perkin-Elmer spectrophotometer), and nmr-spectra (Varian spectrometer), were all found consistent with the expected structures.

EXAMPLE 1

To a stirred ice/acetone-cooled solution of 15.79 g. of benzyloxycarbonyl-L-pyroglutamic acid described by Gibian, et al. in Ann. Chem. 640, page 145 (1961) and 7.59 g. of N-hydroxysuccinimide in 60 ml. of 1,2-dimethoxyethane was added 13.61 g. of DCCI. The reaction mixture was stirred in the cold for 2 hours and then overnight at room temperature. The precipitated dicyclohexylurea was removed by filtration and washed with two small portions of 1,2-dimethoxyethane. The combined filtrates were concentrated under reduced pressure to a viscous oil which was crystallized from about 100 ml. of isopropanol. The crystals were collected on a filter, washed with isopropanol and ether, and dried to give 16.43 g. (76% of theory) of the benzyloxycarbonyl-L-pyroglutamic acid N-hydroxysuccinimide ester, melting at 131–2° C.; $[\alpha]_D^{25} = -23°$ ($c = 1.80$ in DMF).

A solution of 13.51 g. of the above active ester in 25 ml. of dioxane was added to a stirred solution of L-histidine sodium salt, prepared from 6.42 g. of L-histidine and 5.12 g. of sodium carbonate pentahydrate in 50 ml. of water. The reaction mixture was stirred at room temperature for 4 hours and concentrated to a volume of 30 ml. under reduced pressure at a bath temperature below 40° C. The solution was neutralized with 86.5 ml. of 0.957 N hydrochloric acid and subsequently concentrated to about 20 ml. The resulting precipitate was collected on a filter; the solid was washed with two 10-ml. portions of ice water, and recrystallized from 30% aqueous methanol to yield, after drying, 9.40 g. (62% of theory) of white needles representing benzyloxycarbonyl-l-pyroglutamyl-l-histidine. This compound does not melt but starts to decompose at 149° C.; $[\alpha]_D^{25} = -1°$ ($c = 1.08$ in DMF).

A solution of 1.005 g. of the above blocked dipeptide and 0.342 g. of L-prolinamide, obtained from L-prolinamide hydrochloride by treatment with Rexyn No. 201 (OH-form; marketed by The Fisher Scientific Company, Fair Lawn, New Jersey) in 7 ml. of DMF was cooled in an ice bath; 0.578 g. of DCCI and 0.5 ml. of N,N-dimethylformamide (elsewhere herein simply referred to as DMF) were added, stirring was started and continued overnight as the reaction attained room temperature. Precipitated dicyclohexylurea was collected, filtered and washed with three 1-ml. portions of DMF. The combined filtrates were added drop-wise with stirring to 200 ml. of ether. The supernatent was decanted and the residue dissolved in 10 ml. of ethanol which was added to 190 ml. of ether. The white powder obtained was collected and crystallized from ethanol to yield 0.459 g. of the desired peptide, melting at 184–6° C. The combined ethanolic mother liquors (from the ether precipitation and recrystallization) were evaporated to dryness to leave a residue of 1.070 g. which was purified by chromatography on 40 g. of silica gel. Elution of the column with two 100-ml. portions of ethanol-chloroform 2:3 removed the nonpolar impurities. The desired peptide was then eluted with three 100-ml. portions of ethanol-chloroform 3:2. After evaporation of the solvent and crystallization of the residue from ethanol, an additional 0.328 g. of the desired compound was obtained melting at 180–3° C. The combined yield of benzyloxycarbonyl-L-pyroglutamyl-L-histidyl-L-prolinamide was therefore 63% of theory; a further recrystallization according to the above method raised the melting point to 186–7° C.; $[\alpha]_D^{25} = -43°$ ($c = 1.02$ in DMF).

EXAMPLE 2

A solution of 2.002 g. of the hemihydrate of the blocked tripeptide of Example 1 in 200 ml. of methanol was allowed to stand for 9 days at room temperature. Thin layer chromatography showed the solution to contain two components. After evaporation of the solvent, the residue (2.1 g.) was dissolved in 25 ml. of chloroform-methanol 4:1 which was separated into its components by chromatography over 60 g. of silica gel, using chloroform-methanol 4:1 as the eluate until substantially no product eluted, followed by chloroform-methanol 2:1.

The first-eluted material, after evaporation of the solvent showed, by thin layer chromatography, to be a single product which was identified as benzyloxycarbonyl-L-($O^5$-methyl)-glutamyl-L-histidyl-L-prolinamide; $[\alpha]_D^{25} = -22°$ ($c = 1.06$ in DMF). This compound could not be induced to crystallize; it was obtained in a yield of 85% of theory.

The compound eluted by the second solvent mixture was obtained in a yield of 12% and was found to be pure TRH; it was lyophilized, providing 0.142 g. of a material that matched a known sample in all physical and chemical respects.

EXAMPLE 3

A solution of 0.448 g. of the main product of Example 2 in 50 ml. of methanol containing 1.65 ml. of 1.03 N hydrochloric acid was hydrogenolyzed over a period of 90 minutes in the presence of 0.450 g. of palladium black and a hydrogen pressure of 30 psi. The catalyst was then removed by filtration and washed on the filter with methanol. The filtrate and wash liquor were combined and evaporated under reduced pressure to leave 0.393 g. of a residue which was dissolved in 20 ml. of methanol. This solution was added to 500 ml. of stirred ether and the formed white precipitate was collected on a filter, washed with several small portions of ether and dried to yield 0.341 g. (86% of theory) of L-($O^5$-methyl)glutamyl-L-histidyl-L-prolinamide dihydrochloride which decomposes between 195° and 200° C.; $[\alpha]_D^{25} = -29°$ ($c = 1.10$ $H_2O$).

By replacing the hydrochloric acid in the above procedure with acetic acid, the corresponding acetate salt was obtained but it proved to contain a small amount of TRH. Similar behavior is found with succinic and citric acid while, by using phosphoric or sulfuric acid, the same result (substantially no TRH) is obtained as with hydrochloric acid.

In a repetition of this procedure, no acid was added to the hydrogenolysis mixture with the result that most of the benzyloxycarbonyl-L-($O^5$-methyl)glutamyl-L-histidyl-L-prolinamide converted directly to TRH.

EXAMPLE 4

A solution of 0.291 g. of the acetate salt of the tripeptide in Example 3 in 30 ml. of dioxane-water 1:1 containing 0.141 g. of triethylamine was allowed to react at room temperature overnight. Evaporation of the solvent under reduced pressure left 0.409 g. of a white residue which was redissolved in chloroform-methanol 1:2 and chromatographed using 20 g. of silica gel. The same solvent mixture eluted a single substance which was obtained as a white powder after evaporation of the solvent; it was redissolved in water, the solution was filtered through a Millipore filter and lyophilized to yield 0.238 g. of the acetate salt of TRH. Treatment of this material with 1 g. of Rexyn No. 201 (OH-form) as a methanolic solution in the usual fashion produced, after solvent evaporation, 0.228 g. of TRH. This material was again dissolved in water, filtered and lyophilized to produce 0.195 g. of pure TRH.

When in the above Example the triethylamine is replaced by an equivalent amount of tri-n-butylamine, N-ethylmorpholine, pyridine or N-methylpiperidine, the same results are obtained.

Instead of purifying the individual intermediates as in the above examples, the compound made by the process of Example 1 can be treated with methanol as shown in Example 2 and the resulting mixture of the b-enzyloxycarbonly-($O^5$-methyl)-glutamyl-histidyl-prolinamide and TRH can be treated according to the process of Example 3. The resulting mixture, upon standing with a tertiary amine produces TRH essentially in the same purity after the work-up described in Example 4.

As pointed out above, the new compounds to which this invention is primarily directed are unique in that they are immediate precursors for TRH which can be purified simply by crystallizations. No other compounds described to date and leading directly to TRH can be purified in this manner. In addition, the conversion of the present compound to TRH is a simple operation leading to TRH in nearly quantitative yields. Thus, the new compounds and their conversion to TRH present surprising and unique advantages over other methods of synthesis for TRH. In addition, the compound of formula I wherein R is hydrogen produces prolactin stimulation in warm-blooded animals in a degree only slightly below the level attained with TRH (75% of the corresponding TRH value; established by the method of Tashjian, et al. in *Biochem. & Biophys. Res. Comm.*, Vol. 43, pages 516–523 of 1971) but being devoid of the psychotropic activity of the latter.

The above hydrogenolysis procedure leading to the compound of structure I wherein R is hydrogen or directly to TRH can be carried out in simple standard laboratory or manufacturing equipment since no significant excess pressure of hydrogen is required: the hydrogenation proceeds satisfactorily in low pressure hydrogenation equipment such as a Parr shaker or similar equipment used in the laboratory or on a commercial scale. Suitable hydrogen pressures of between 15 and 45 pounds psi. can be used for complete conversion. Pressures as high as 3–5 atmospheres may also be used but no advantage is seen to use such high pressures since complete conversion takes place at below 3 atmospheres in about 2 hours or less. Among the catalysts useful for the operation, the various commercially available catalytic forms of palladium are suitable such as palladium black, palladium precipitated on charcoal or on silica gel or any other support means ordinarily used in the trade.

Where the deblocked compound of structure I is desired, the corresponding blocked analog is hydrogenated in the presence of at least two molar equivalents of a mineral or relatively strong organic acid. In the absence of such acid, a portion of the blocked tripeptide converts directly to TRH. Among the acids most suitable are the acetic, maleic, tartaric, succinic, citric, sulfuric, hydrochloric or phosphoric acid. Generally, a nontoxic acid is preferred since the deblocked compound of structure I is biologically useful and can be used in the form of such formed acid addition salt (or as the free base) in oral amounts of between 0.001 and 0.5 mg. to mature humans in order to promote a prolactin surge which, in lactating women, increases milk flow. In mature milk-producing or post-partum animals, oral amounts of 1–50 mg. or intravenous amounts of 0.01–1.0 mg. per animal per day produce a marked increase in milk flow.

We claim:
1. A compound of the structure:

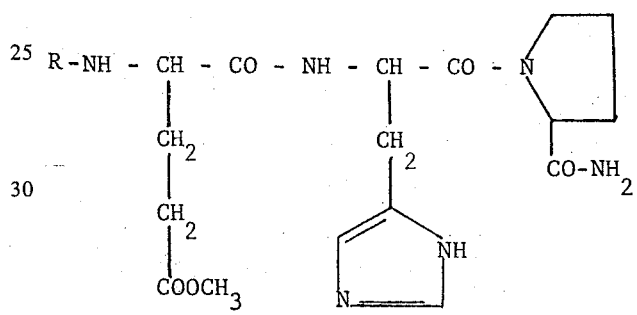

wherein each amino acid moiety is in the L-configuration, R is hydrogen or the benzyloxycarbonyl group and an acid addition salt thereof.

2. The compound of claim 1 wherein R is hydrogen.

3. The compound of claim 1 wherein R is benzyloxycarbonyl.

* * * * *